United States Patent
Alsayegh et al.

(10) Patent No.: US 12,281,259 B1
(45) Date of Patent: Apr. 22, 2025

(54) EFFERVESCENT TABLET FOR ENHANCED OIL RECOVERY AND ENHANCED OIL RECOVERY METHOD USING THE SAME

(71) Applicant: KUWAIT UNIVERSITY, Safat (KW)

(72) Inventors: Naser Alsayegh, Shuwaikh (KW); Nawaf F. Aljuwayhel, Kuwait (KW); Abbas Hamoud, Al-Eqaila (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 18/792,012

(22) Filed: Aug. 1, 2024

Related U.S. Application Data

(62) Division of application No. 18/650,499, filed on Apr. 30, 2024, now Pat. No. 12,139,666.

(51) Int. Cl.
C09K 8/592 (2006.01)

(52) U.S. Cl.
CPC .................. C09K 8/592 (2013.01)

(58) Field of Classification Search
CPC ....... C09K 8/58; C09K 8/592; C09K 2208/10
See application file for complete search history.

(56) References Cited

U.S. PATENT DOCUMENTS

| | | | | |
|---|---|---|---|---|
| 4,694,906 | A * | 9/1987 | Hutchins | C09K 8/594 166/275 |
| 4,820,428 | A * | 4/1989 | McLennan | C09K 8/54 507/920 |
| 10,337,304 | B1 | 7/2019 | Yee | |
| 11,384,280 | B1 | 7/2022 | Al-Qasim et al. | |
| 2008/0004189 | A1* | 1/2008 | Smith | C09K 8/68 507/236 |
| 2011/0206630 | A1 | 8/2011 | Rude | |
| 2015/0175876 | A1* | 6/2015 | Resasco | C09K 8/594 166/270.1 |
| 2021/0122963 | A1* | 4/2021 | Smith | C09K 8/035 |
| 2022/0306929 | A1 | 9/2022 | Al-Qasim et al. | |
| 2023/0242770 | A1 | 8/2023 | Alsayegh et al. | |

FOREIGN PATENT DOCUMENTS

| | | | | |
|---|---|---|---|---|
| CN | 113913170 A | * | 1/2022 | |
| WO | WO-2012110993 A1 | * | 8/2012 | ............. A01N 25/34 |

OTHER PUBLICATIONS

Lasarte-Aragonés, G., Lucena, R., Cárdenas, S. et al. Effervescence-assisted carbon nanotubes dispersion for the micro-solid-phase extraction of triazine herbicides from environmental waters. Anal Bioanal Chem 405, 3269-3277 (2013). https://doi.org/10.1007/s00216-013-6718-3 (Year: 2013).*
Translation of CN 113913170 A (Year: 2022).*
Telmadarreie, Ali, et al. "$CO_2$ microbubbles—a potential fluid for enhanced oil recovery: bulk and porous media studies." Journal of Petroleum Science and Engineering 138 (2016): 160-173.
Long, Yunqian, et al. "Enhanced oil recovery by a suspension of core-shell polymeric nanoparticles in heterogeneous low-permeability oil reservoirs." Nanomaterials 9.4 (2019): 600.
Ali, Naser, et al. "Effervescent tablets for carbon-based nanofluids production." Journal of Molecular Liquids 390 (2023): 123083.

\* cited by examiner

*Primary Examiner* — Angela M DiTrani Leff
(74) *Attorney, Agent, or Firm* — Nath, Goldberg & Meyer; Joshua B. Goldberg

(57) ABSTRACT

The effervescent tablet for enhanced oil recovery is made of multi-walled carbon nanotubes (MWCNTs), sodium dodecyl sulfate (SDS), sodium phosphate monobasic ($NaH_2PO_4$), and sodium carbonate ($Na_2CO_3$). To perform enhanced oil recovery, a suspension is first prepared by adding the effervescent tablet to water. This preparation may be performed at room temperature. Steam is then injected into the oil well, followed by flooding the oil well with the suspension. One-third of the pore volume of an oil reservoir of the oil well may be injected with the steam, and two-thirds of the pore volume of the oil reservoir may be flooded with the suspension.

6 Claims, 1 Drawing Sheet

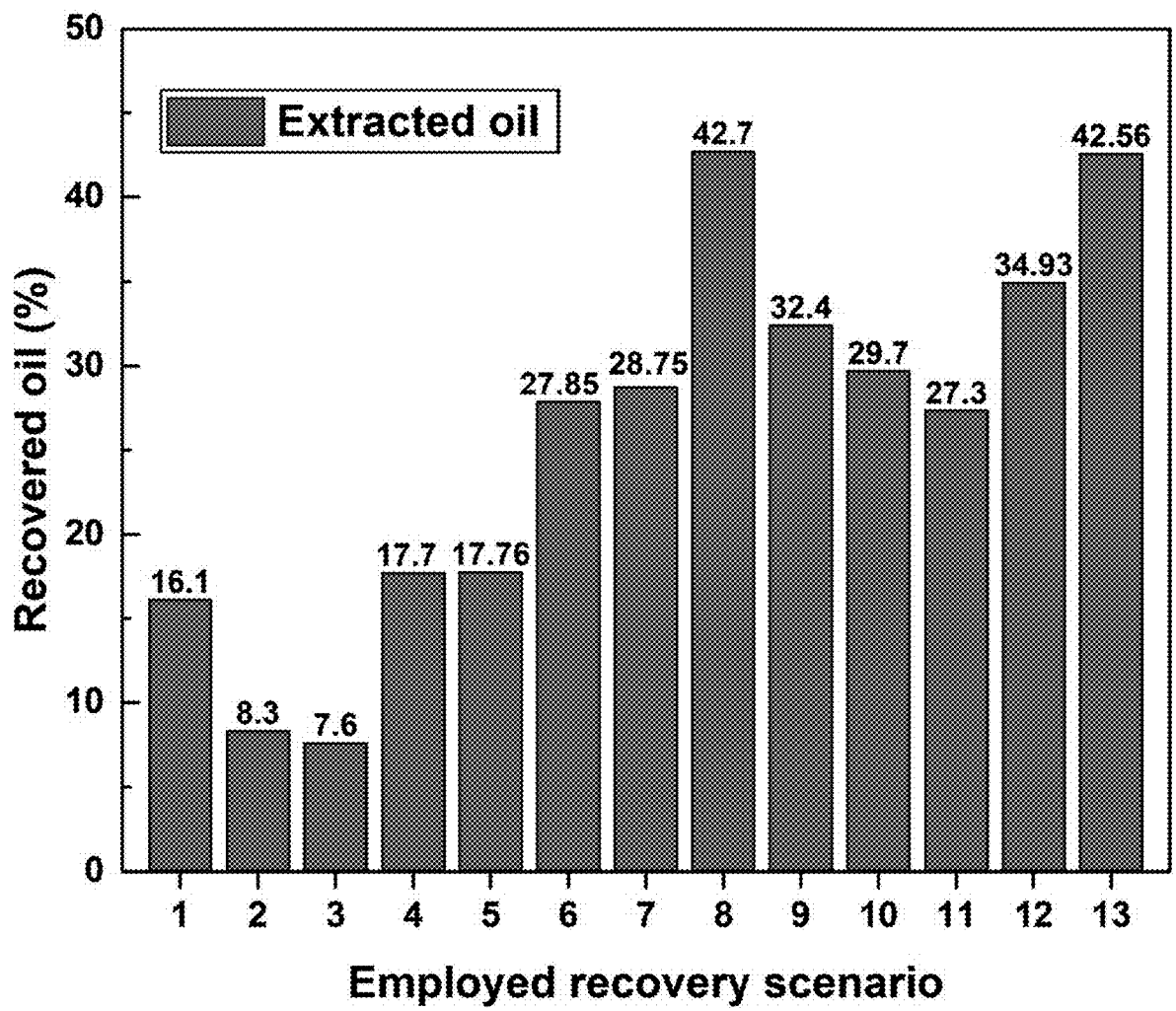

EFFERVESCENT TABLET FOR ENHANCED OIL RECOVERY AND ENHANCED OIL RECOVERY METHOD USING THE SAME

CROSS-REFERENCE TO RELATED APPLICATION

This application is a divisional of U.S. patent application Ser. No. 18/650,499, filed on Apr. 30, 2024, the entire contents of which are incorporated herein by reference.

BACKGROUND

Field

The disclosure of the present patent application relates to enhanced oil recovery, and particularly to an effervescent tablet for producing a suspension for chemical injection enhanced oil recovery.

Description of Related Art

Enhanced oil recovery (EOR), which is sometimes also referred to as "tertiary recovery", is the extraction of crude oil from an oil field that cannot be extracted otherwise. Although the primary and secondary recovery techniques rely on the pressure differential between the surface and the underground well, enhanced oil recovery functions by altering the chemical composition of the oil itself to make it easier to extract. EOR can extract 30% to 60% or more of a reservoir's oil. In comparison, 20% to 40% of the oil is extracted using primary and secondary recovery. There are three primary techniques of EOR: gas injection, thermal injection, and chemical injection. Gas injection (or "miscible flooding") is presently the most commonly used approach in enhanced oil recovery. Miscible flooding is a general term for injection processes that introduce miscible gases into the reservoir. A miscible displacement process maintains reservoir pressure and improves oil displacement because the interfacial tension between oil and gas is reduced. This allows for total displacement efficiency. The gases commonly used in gas injection include carbon dioxide, natural gas and nitrogen. The fluid most commonly used for miscible displacement is carbon dioxide because it reduces the oil viscosity and is less expensive than liquefied petroleum gas. Oil displacement by carbon dioxide injection relies on the phase behavior of the mixtures of that gas and the crude, which are strongly dependent on reservoir temperature, pressure and crude oil composition.

In thermal injection, various methods are used to heat the crude oil in the formation to reduce its viscosity and/or vaporize part of the oil, thus decreasing the mobility ratio. The increased heat reduces the surface tension and increases the permeability of the oil. The heated oil may also vaporize and then condense, forming improved oil. Methods for thermal injection include cyclic steam injection, steam flooding and combustion. These methods improve the sweep efficiency and the displacement efficiency. In cyclic steam injection, steam is first injected into a well for a certain amount of time to heat the oil in the surrounding reservoir to recover approximately 20% of the original oil in place (OOIP). Steam is typically injected into the well at a temperature of 300° C. to 340° C. for a period of weeks to months. Next, the well is allowed to sit for days to weeks to allow heat to soak into the formation. Finally, the hot oil is pumped out of the well for a period of weeks or months. Once the production rate falls off, the well is put through another cycle of injection, soak and production. This process is repeated until the cost of injecting steam becomes higher than the money made from producing oil. In a steam flood (or a "steam drive"), some wells are used as steam injection wells and other wells are used for oil production. Two mechanisms are at work to improve the amount of oil recovered: the first is to heat the oil to higher temperatures, thus decreasing its viscosity so that it more easily flows through the formation toward the producing wells. The second mechanism is the physical displacement, which acts in a manner similar to water flooding, where oil is pushed to the production wells. While more steam is needed for this method than for the cyclic method, it is typically more effective at recovering a larger portion of the oil.

In chemical injection EOR, the injection of various chemicals, usually as dilute solutions, are used to aid mobility and the reduction in surface tension. Injection of alkaline or caustic solutions into reservoirs with oil that have organic acids naturally occurring in the oil will result in the production of soap that may lower the interfacial tension enough to increase production. Injection of a dilute solution of a water-soluble polymer to increase the viscosity of the injected water can increase the amount of oil recovered in some formations. Dilute solutions of surfactants, such as petroleum sulfonates or biosurfactants such as rhamnolipids, may be injected to lower the interfacial tension or capillary pressure that impedes oil droplets from moving through a reservoir. Special formulations of oil, water and surfactant microemulsions can be particularly effective in reducing interfacial tension. Application of these methods is usually limited by the cost of the chemicals and their adsorption and loss onto the rock of the oil containing formation. In all of these methods, the chemicals are injected into several wells and the production occurs in other nearby wells.

EOR processes can be enhanced with nanoparticles in three ways: nanocatalysts, nanofluids, and nanoemulsions. Nanofluids are base fluids that contain nanoparticles in colloidal suspensions. Nanofluids perform many functions in EOR of oil fields, including pore disjoining pressure, channel plugging, interfacial tension reduction, mobility ratio, wettability alteration, and asphaltene precipitation prevention. Nanofluids facilitate disjoining pressure to remove sediment entrapped oil via aggregation at the interface. Alternatively, wettability alteration and interfacial surface tension reduction are other alternative mechanisms of EOR.

Nanofluids for EOR are typically prepared in one of two ways: the one-step (or "single-step") method and the two-step method. In the single-step approach, the particles are formed and dispersed within the hosting fluid in a single stage. The advantages of such an approach are that the suspension has higher dispersion physical stability, and this technique avoids the need to use dry powders, which present difficulties with regard to transport and storage. However, the single-step method of production is associated with residuals that are hard to remove (because of incomplete reactions) and, moreover, this method can only be used to fabricate specific combinations of particles and base fluids. Additionally, the equipment used in the single-step production approach is usually very complicated to operate and very expensive.

The two-step method uses pre-prepared powders which are added to, and dispersed in, a non-dissolving base fluid through a mixing device (e.g., ultrasonicators, homogenizers, magnetic stirrers, etc.). The advantages of this approach are that any type of suspension can be manufactured, the materials are easier to handle, the powders are commercially available, and the technique can be used for both small-scale and large-scale production. However, the specific mixing devices are a particular consideration for suspension production processes that use the two-step approach. This can make implementing this technique difficult in remote areas where electrical sources are limited. Further, suspensions made using the two-step method have lower levels of dispersion physical stability than those prepared with the one-step method. This, however, can be improved to a certain extent by including surfactants in the mixture at the fabrication stage or by employing surface functionalization for the particles.

Regardless of the approach used in fabricating suspensions, the dispersed particle stability needs to be maintained. This is important for achieving the optimal thermophysical properties of the dispersion. Thus, an effervescent tablet for enhanced oil recovery and an enhanced oil recovery method using the same solving the aforementioned problems are desired.

SUMMARY

The effervescent tablet for enhanced oil recovery is made of multi-walled carbon nanotubes (MWCNTs), sodium dodecyl sulfate (SDS), sodium phosphate monobasic ($NaH_2PO_4$), and sodium carbonate ($Na_2CO_3$). The concentration of the multi-walled carbon nanotubes may be 9.26 wt %, the concentration of the sodium dodecyl sulfate may be 9.26 wt %, the concentration of the sodium phosphate monobasic may be 62.96 wt %, and the concentration of the sodium carbonate may be 18.52 wt %. In an alternative formulation, the concentration of the multi-walled carbon nanotubes may be 5.10 wt %, the concentration of the sodium dodecyl sulfate may be 5.10 wt %, the concentration of the sodium phosphate monobasic may be 69.38 wt %, and the concentration of the sodium carbonate may be 20.41 wt %. As a further alternative, the concentration of the multi-walled carbon nanotubes may be 3.52 wt %, the concentration of the sodium dodecyl sulfate may be 3.52 wt %, the concentration of the sodium phosphate monobasic may be 71.83 wt %, and the concentration of the sodium carbonate may be 21.13 wt %. As a further alternative, the concentration of the multi-walled carbon nanotubes may be 1.83 wt %, the concentration of the sodium dodecyl sulfate may be 1.83 wt %, the concentration of the sodium phosphate monobasic may be 74.44 wt %, and the concentration of the sodium carbonate may be 21.89 wt %. In another alternative formulation, the concentration of the multi-walled carbon nanotubes may be 0.38 wt %, the concentration of the sodium dodecyl sulfate may be 0.38 wt %, the concentration of the sodium phosphate monobasic may be 76.69 wt %, and the concentration of the sodium carbonate may be 22.55 wt %.

To perform enhanced oil recovery, a suspension is first prepared by adding the effervescent tablet to water. This preparation may be performed at room temperature. Steam is then injected into the oil well, followed by flooding the oil well with the suspension. As a non-limiting example, one-third of the pore volume of an oil reservoir of the oil well may be injected with the steam, and two-thirds of the pore volume of the oil reservoir may be flooded with the suspension. The steam may be injected into the oil well at a temperature of approximately 150° C. at a flow rate of approximately 10 cm³/min. Prior to flooding, the suspension may be heated to approximately 98° C. The flooding of the oil well with the suspension may be performed by injecting the into the oil well at a flow rate of approximately 5 cm³/min.

These and other features of the present subject matter will become readily apparent upon further review of the following specification.

BRIEF DESCRIPTION OF DRAWINGS

The sole drawing FIGURE is a graph comparing experimental results of enhanced oil recovery performed using the effervescent tablets for enhanced oil recovery and conventional chemical enhanced oil recovery suspensions.

DETAILED DESCRIPTION

The effervescent tablet for enhanced oil recovery is made of multi-walled carbon nanotubes (MWCNTs), sodium dodecyl sulfate (SDS), sodium phosphate monobasic ($NaH_2PO_4$), and sodium carbonate ($Na_2CO_3$). The concentration of the multi-walled carbon nanotubes may be 9.26 wt %, the concentration of the sodium dodecyl sulfate may be 9.26 wt %, the concentration of the sodium phosphate monobasic may be 62.96 wt %, and the concentration of the sodium carbonate may be 18.52 wt %. In an alternative formulation, the concentration of the multi-walled carbon nanotubes may be 5.10 wt %, the concentration of the sodium dodecyl sulfate may be 5.10 wt %, the concentration of the sodium phosphate monobasic may be 69.38 wt %, and the concentration of the sodium carbonate may be 20.41 wt %. As a further alternative, the concentration of the multi-walled carbon nanotubes may be 3.52 wt %, the concentration of the sodium dodecyl sulfate may be 3.52 wt %, the concentration of the sodium phosphate monobasic may be 71.83 wt %, and the concentration of the sodium carbonate may be 21.13 wt %. As a further alternative, the concentration of the multi-walled carbon nanotubes may be 1.83 wt %, the concentration of the sodium dodecyl sulfate may be 1.83 wt %, the concentration of the sodium phosphate monobasic may be 74.44 wt %, and the concentration of the sodium carbonate may be 21.89 wt %. In another alternative formulation, the concentration of the multi-walled carbon nanotubes may be 0.38 wt %, the concentration of the sodium dodecyl sulfate may be 0.38 wt %, the concentration of the sodium phosphate monobasic may be 76.69 wt %, and the concentration of the sodium carbonate may be 22.55 wt %.

As a non-limiting example, the effervescent tablets may be made by mixing the multi-walled carbon nanotubes, sodium dodecyl sulfate, sodium phosphate monobasic, and sodium carbonate (each in powder form) for 15 minutes using a mortar and pestle. The mixed powders may then be placed in a 2.5 cm inner diameter die and then compressed into tablets using a pneumatic compression instrument at 100 kN.

To perform enhanced oil recovery, a suspension is first prepared by adding the effervescent tablet to water. This preparation may be performed at room temperature. Steam is then injected into the oil well, followed by flooding the oil well with the suspension. As a non-limiting example, one-third of the pore volume of an oil reservoir of the oil well may be injected with the steam, and two-thirds of the pore volume of the oil reservoir may be flooded with the suspension. The steam may be injected into the oil well at a temperature of approximately 150° C. at a flow rate of approximately 10 cm³/min. Prior to flooding, the suspension may be heated to approximately 98° C. The flooding of the oil well with the suspension may be performed by injecting the into the oil well at a flow rate of approximately 5 cm$^3$/min.

For purposes of testing the efficacy of the effervescent tablet for enhanced oil recovery, tablets with the above concentrations were prepared. The masses of each component are shown in Table 1 below for each of the five samples.

TABLE 1

Compositions of Sample Tablets

| Tablet Sample | Material weight | | | | Total powder weight (g) |
|---|---|---|---|---|---|
| | MWCNTs (g) | SDS (g) | NaH$_2$PO$_4$ (g) | Na$_2$CO$_3$ (g) | |
| 1 | 0.189 | 0.189 | 1.285 | 0.378 | 2.041 |
| 2 | 0.189 | 0.189 | 2.570 | 0.756 | 3.704 |
| 3 | 0.189 | 0.189 | 3.856 | 1.134 | 5.368 |
| 4 | 0.095 | 0.095 | 3.856 | 1.134 | 5.180 |
| 5 | 0.019 | 0.019 | 3.856 | 1.134 | 5.028 |

Testing was performed using a DSS-945Z Digital Steamflood System manufactured by Coretest® Systems, Inc. of Morgan Hill, California. The core of the test rig was filled and then packed with a mixture of sand, water and crude oil. These three components were mixed for three hours using a mixing device, after which they were packed in the test rig core and kept overnight before conducting the enhanced oil recovery (EOR) tests. For the sand, an unconsolidated sand was used after undergoing multiple meshing stages to provide a relatively uniform distribution of sand particles with sizes between 0.15 mm and 1.18 mm. The density of the sand was found to be 2.32 g/cm$^3$. Field data obtained from the Lower Fares (LF) field formation in Kuwait showed that the porosity of the LF formations ranges between 30% and 40%. To be conservative in the tests, a value of 30% was selected. The data also showed that the water saturation is ~20% and oil is ~80%. Further, the gas saturation was assumed to be zero since heavy oil reservoirs usually do not contain free gases, and crude compositions are quite low in the lighter hydrocarbon components that are liberated during production, such as C1, C2 and C3. Moreover, since the bulk volume, pore volume, grain volume, fluid volumes and sand mass are required for the sand packing preparation process, they were calculated and found to be 4,000 cm$^3$, 1200 cm$^3$, 2800 cm$^3$, 1200 cm$^3$ (oil: 960 cm$^3$ and water: 240 cm$^3$) and 6.5 kg, respectively.

The specifications of the water and crude oil that were used in the mixture are shown below in Tables 2 and 3, respectively. It should be noted that the oil was obtained from an LF oil well, and the water was prepared in the lab according to the water characteristics of the actual water in the LF well. Furthermore, the oil, water and sand were added and initially manually mixed. The mixture was preheated to 50° C. to increase its mobility. Afterwards, a mixing device was used for three hours to homogenously mix the three components and ensure their consistency. After, the mixture was slowly added into a core holder on a vibrating surface to assist the displacement of the mixture. A fine mesh was added at the bottom end of the core holder to prevent sand particles from separating. A metal rod was used to push the sand mixture into the core holder and compress it uniformly. Once the packing process was complete, a second mesh was placed on the top end of the core holder. The whole process was performed vertically to exploit the effect of gravity and assist in the packing process. The inlet and outlet pieces were assembled and the medium of flow was sealed off to be ready for the core flooding tests (i.e., the EOR tests).

TABLE 2

Composition of the Water for Testing

| Element | Value | Unit |
|---|---|---|
| Calcium | 1,675 | mg/L |
| Magnesium | 1,450 | mg/L |
| Sodium | 10,200 | mg/L |
| Potassium | 135 | mg/L |
| Chloride | 22,550 | mg/L |
| pH | 7.1 | — |
| Density at 25° C. | 1.024 | g/cc |
| TDS (Measured) | 36,560 | mg/L |

TABLE 3

Components and Specifications of Cude Oil for Testing

| Components | Weight Percentage | Unit |
|---|---|---|
| C1-C5 | 0 | % |
| C6-C10 | 2.09 | % |
| C11-C15 | 3.22 | % |
| C16-C20 | 4.47 | % |
| C21-C25 | 4.50 | % |
| C26-C30 | 4.03 | % |
| C31-C32 | 2.24 | % |
| C32+ | 79.44 | % |
| Total | 100 | % |

| Specification | Value | Unit |
|---|---|---|
| API | 11.90 | ° |
| Sp.Gr at 15° C. | 0.98673 | — |
| Density at 15° C. | 0.98576 | g/cm$^3$ |
| Density at 25° C. | 0.97953 | g/cm$^3$ |
| Viscosity, Kinematic at 25° C. | 2589.8 | cSt |

For purposes of comparison, two types of suspensions were prepared: suspensions prepared using the effervescent tablets, as described above, and conventional chemical EOR suspensions. For the effervescent-based suspensions, the as-prepared effervescent tablets were dropped in the liquid container that is attached to the test rig, which contained 1 L of distilled water (DW) at 25° C. This process was used to form three test suspensions with 0.01 vol. %, 0.05 vol. % and 0.1 vol. % of MWCNTs. Once the reaction was completed and the suspension was formed, the container hosting the suspension was heated to 98° C. before being injected in the core. The conventional suspensions were fabricated by externally adding MWCNTs and SDS (1:1 weight ratio) to DW (4 batches each containing 0.25 L to obtain a total of 1 L) and then dispersing the content in a controlled temperature bath sonicator (25° C.) according to the employed vol. % as follows: 0.01 vol. % (6 minutes of sonication); 0.05 vol. % (9 minutes of sonication); and 0.10 vol. % (12 minutes of sonication).

Once the conventional suspensions were fabricated, they were placed in the test rig liquid container and then heated to 98° C. before being injected into the core. It should be noted that all as-prepared suspensions were physically stable for at least 24 hours after their fabrication. For the EOR testing, 13 different scenarios were investigated, as follows:
1. Pure steam injection (150° C. at 10 cm$^3$/min);
2. Treated seawater flooding (98° C. at 5 cm$^3$/min). The treated seawater composition is shown below in Table 4;

3. Distilled water (DW) flooding (98° C. at 5 cm³/min). The DW properties are shown below in Table 5;
4. 400 cm³ steam injection (150° C. at 10 cm³/min) followed by treated seawater flooding (98° C. at 5 cm³/min);
5. 400 cm³ steam injection (150° C. at 10 cm³/min) followed by distilled water flooding (98° C. at 5 cm³/min);
6. 400 cm³ steam injection (150° C. at 10 cm³/min) followed by sample 1 (see Table 1) tablet-based suspension flooding (98° C. at 5 cm³/min);
7. 400 cm³ steam injection (150° C. at 10 cm³/min) followed by sample 2 (see Table 1) tablet-based suspension flooding (98° C. at 5 cm³/min);
8. 400 cm³ steam injection (150° C. at 10 cm³/min) followed by sample 3 (see Table 1) tablet-based suspension flooding (98° C. at 5 cm³/min);
9. 400 cm³ steam injection (150° C. at 10 cm³/min) followed by sample 4 (see Table 1) tablet-based suspension flooding (98° C. at 5 cm³/min);
10. 400 cm³ steam injection (150° C. at 10 cm³/min) followed by sample 5 (see Table 1) tablet-based suspension flooding (98° C. at 5 cm³/min);
11. 400 cm³ steam injection (150° C. at 10 cm³/min) followed by 0.01 vol. % conventional suspension flooding (98° C. at 5 cm³/min);
12. 400 cm³ steam injection (150° C. at 10 cm³/min) followed by 0.05 vol. % conventional suspension flooding (98° C. at 5 cm³/min); and
13. 400 cm³ steam injection (150° C. at 10 cm³/min) followed by 0.10 vol. % conventional suspension flooding (98° C. at 5 cm³/min).

TABLE 4

Treated Seawater Composition

| Results of analysis | Unit | Description/value |
|---|---|---|
| Appearance | — | Colorless |
| Conductivity | mS/cm | 67.4 |
| Thermal conductivity | W/m · K | 0.609 |
| Viscosity | mPa · s | 1.19 |
| Density | g/cm³ | 1.03 |
| Specific heat capacity | kJ/kg · K | 4.009 |
| pH | — | 7.9 |
| Bi-carbonate alkalinity | mg/L | 221.15 |
| Carbonate alkalinity | mg/L | 0 |
| OH-alkalinity | mg/L | 0 |
| Total alkalinity | mg/L | 221.15 |
| Sodium | mg/L | 13750 |
| Calcium | mg/L | 541 |
| Magnesium | mg/L | 1,890.70 |
| Potassium | mg/L | 610 |
| Strontium | mg/L | 8.3 |
| Barium | mg/L | 0 |
| Iron | mg/L | 0.06 |
| Lithium | mg/L | 0.28 |
| Silicon | mg/L | 0.42 |
| Boron | mg/L | 3 |
| Chloride | mg/L | 23250 |
| Sulfate | mg/L | 3650 |
| TDS (calculated) | mg/L | 43,924.91 |

TABLE 5

Distilled Water Properties

| Results of analysis | Unit | Description/value |
|---|---|---|
| Appearance | — | Colourless |
| Conductivity | mS/cm | <0.001 |
| Thermal conductivity | W/m · K | 0.606 |
| Viscosity | mPa · s | 0.89 |
| Density | g/cm³ | 0.983 |
| Specific heat capacity | kJ/kg · K | 4.182 |
| pH | — | 5.77 |
| Bi-carbonate alkalinity | mg/L | 2.86 |
| Carbonate alkalinity | mg/L | 0 |
| OH-alkalinity | mg/L | 0 |
| Total alkalinity | mg/L | 2.86 |
| Sodium | mg/L | <0.01 |
| Calcium | mg/L | <0.01 |
| Magnesium | mg/L | <0.01 |
| Potassium | mg/L | <0.01 |
| Strontium | mg/L | <0.01 |
| Barium | mg/L | 0.15 |
| Iron | mg/L | <0.01 |
| Lithium | mg/L | <0.01 |
| Silicon | mg/L | <0.01 |
| Boron | mg/L | <0.01 |
| Chloride | mg/L | <0.01 |
| Sulfate | mg/L | <1 |
| TDS (calculated) | mg/L | 3.02 |

When combining steam injection with other flooding processes, steam injection of 400 cm³ was employed initially until the first drop of oil was obtained, then the second recovery approach (i.e., water or suspension) of 800 cm³ was introduced. The total of 400 cm³ and 800 cm³ is equal to the pore volume of the core. Additionally, the steam injection and liquid (or suspension) flooding rates were selected to be 10 cm³/min and 5 cm³/min, respectively, to maintain the inner core pressure at 250 psi. Further, the core temperature throughout the oil recovery tests was fixed at 30° C. The previous pressure and temperature values were maintained to reflect the actual reservoir conditions. For the EOR testing procedure, one of the above 13 scenarios was employed for each test, after which the extracted oil was collected then analyzed. The results showed that the minimum oil recovery (7.6%) was obtained when employing scenario 3, whereas the highest (42.7%) was found when implementing scenario 8. The oil recovery results of all 13 scenarios can be seen in the sole drawing FIGURE. The characteristics of the as-collected recovered oil samples in terms of API, density (25° C.) and viscosity (25° C.) are provided in Table 6 below.

TABLE 6

Characteristics of the As-collected Oil

Extracted oil specification

| | API (°) | Specific gravity at 15° C. | Density at 15° C. (g/cm³) | Density at 25° C. (g/cm³) | Viscosity at 25° C. (cSt) |
|---|---|---|---|---|---|
| 1 | 11.05 | 0.99266 | 0.99168 | 0.98547 | 3596.1 |
| 2 | 11.30 | 0.99441 | 0.99344 | 0.98725 | 3439.1 |
| 3 | 11.33 | 0.99072 | 0.98975 | 0.98352 | 3437.5 |
| 4 | 11.40 | 0.99022 | 0.98925 | 0.98303 | 3136.5 |
| 5 | 11.32 | 0.99075 | 0.98977 | 0.98355 | 3571.1 |
| 6 | 11.25 | 0.99124 | 0.99027 | 0.98404 | 3541.5 |
| 7 | 11.32 | 0.99075 | 0.98978 | 0.98356 | 3365.6 |
| 8 | 11.30 | 0.99090 | 0.98993 | 0.98371 | 3138.2 |
| 9 | 11.62 | 0.98621 | 0.98524 | 0.97899 | 3050.8 |
| 10 | 11.65 | 0.98728 | 0.98631 | 0.98007 | 3061.0 |

TABLE 6-continued

Characteristics of the As-collected Oil

Extracted oil specification

| | API (°) | Specific gravity at 15° C. | Density at 15° C. (g/cm³) | Density at 25° C. (g/cm³) | Viscosity at 25° C. (cSt) |
|---|---|---|---|---|---|
| 11 | 11.38 | 0.99037 | 0.98940 | 0.98317 | 3406.4 |
| 12 | 11.49 | 0.98911 | 0.98814 | 0.98190 | 3228.4 |
| 13 | 11.60 | 0.98785 | 0.98688 | 0.98063 | 3050.3 |

It is to be understood that the effervescent tablet for enhanced oil recovery and the enhanced oil recovery method using the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. An effervescent tablet for enhanced oil recovery, comprising:
   multi-walled carbon nanotubes;
   sodium dodecyl sulfate;
   sodium phosphate monobasic; and
   sodium carbonate.

2. The effervescent tablet for enhanced oil recovery as recited in claim 1, wherein the concentration of the multi-walled carbon nanotubes is 9.26 wt %, wherein the concentration of the sodium dodecyl sulfate is 9.26 wt %, wherein the concentration of the sodium phosphate monobasic is 62.96 wt %, and wherein the concentration of the sodium carbonate is 18.52 wt %.

3. The effervescent tablet for enhanced oil recovery as recited in claim 1, wherein the concentration of the multi-walled carbon nanotubes is 5.10 wt %, wherein the concentration of the sodium dodecyl sulfate is 5.10 wt %, wherein the concentration of the sodium phosphate monobasic is 69.38 wt %, and wherein the concentration of the sodium carbonate is 20.41 wt %.

4. The effervescent tablet for enhanced oil recovery as recited in claim 1, wherein the concentration of the multi-walled carbon nanotubes is 3.52 wt %, wherein the concentration of the sodium dodecyl sulfate is 3.52 wt %, wherein the concentration of the sodium phosphate monobasic is 71.83 wt %, and wherein the concentration of the sodium carbonate is 21.13 wt %.

5. The effervescent tablet for enhanced oil recovery as recited in claim 1, wherein the concentration of the multi-walled carbon nanotubes is 1.83 wt %, wherein the concentration of the sodium dodecyl sulfate is 1.83 wt %, wherein the concentration of the sodium phosphate monobasic is 74.44 wt %, and wherein the concentration of the sodium carbonate is 21.89 wt %.

6. The effervescent tablet for enhanced oil recovery as recited in claim 1, wherein the concentration of the multi-walled carbon nanotubes is 0.38 wt %, wherein the concentration of the sodium dodecyl sulfate is 0.38 wt %, wherein the concentration of the sodium phosphate monobasic is 76.69 wt %, and wherein the concentration of the sodium carbonate is 22.55 wt %.

\* \* \* \* \*